April 8, 1969 S. S. CUSTER, JR 3,437,921

AM/PM CONVERSION TESTING BY TRANSMITTING HIGH AND LOW AMPLITUDE SIGNALS OF DIFFERENT FREQUENCIES THROUGH THE DEVICE UNDER TEST AND MEASURING THE PHASE MODULATION INDUCED IN THE LOW LEVEL SIGNAL

Filed Nov. 16, 1966

INVENTOR
S. S. CUSTER, JR.
BY David P. Kelley
ATTORNEY

April 8, 1969 S. S. CUSTER, JR 3,437,921

AM/PM CONVERSION TESTING BY TRANSMITTING HIGH AND LOW AMPLITUDE SIGNALS OF DIFFERENT FREQUENCIES THROUGH THE DEVICE UNDER TEST AND MEASURING THE PHASE MODULATION INDUCED IN THE LOW LEVEL SIGNAL

Filed Nov. 16, 1966

Sheet 2 of 2

United States Patent Office 3,437,921

Patented Apr. 8, 1969

3,437,921

AM/PM CONVERSION TESTING BY TRANSMITTING HIGH AND LOW AMPLITUDE SIGNALS OF DIFFERENT FREQUENCIES THROUGH THE DEVICE UNDER TEST AND MEASURING THE PHASE MODULATION INDUCED IN THE LOW LEVEL SIGNAL

Stroud S. Custer, Jr., Fleetwood, Pa., assignor to Bell Telephone Laboratories, Incorporated, Murray Hill, N.J., a corporation of New York Filed Nov. 16, 1966, Ser. No. 594,725
Int. Cl. G01r
U.S. Cl. 324—58 7 Claims This invention relates to apparatus and methods for measuring the amplitude modulation to phase modulation conversion of systems or devices in which electrical length is a function of power level, such as, for example, traveling wave tubes.

The trend in telephone facilities has been toward broad bandwidth in communications circuits to meet the growing demand for frequency space required to transmit television and data signals as well as voice signals. Increased bandwidth requires increased circuit precision, which in turn calls for greater accuracy in the measurement of system performance. A relatively new circuit parameter which is a measure of system performance in broadband FM systems is a level-dependent phase distortion which has been variously termed level to phase conversion and amplitude modulation to phase modulation conversion, hereinafter abbreviated AM/PM conversion and measured in degrees per db.

AM/PM conversion is a characteristic of devices in which the electrical length of the device is a function of power level. If, for instance, an amplitude modulated signal is applied to the input of such a device, the electrical length will vary with the power level (and therefore the amplitude level also) of the AM signal. As the power level decreases, the electrical length, for instance, might increase, resulting in a corresponding phase delay (or time delay) of the AM signal. Of course, for each different instantaneous power level the phase delay will be different. The AM signal at the output is consequently phase modulated in acordance with its own changing power level. That such phase modulation is considered to be interference or distortion will be better understood from the following discussion.

Consider the case of amplification of a low-index FM signal by a traveling wave tube. Assume the frequency deviation of the FM signal is ±5 mHz. peak to peak, or an equivalent phase deviation of ±0.5 radian for a 10 mHz. modulating signal. These values are typical of a radio relay system. Let us also assume there is a residual amplitude modulation of one db (about 13 percent) in this FM signal, and suppose further that the signal is amplified by a T.W.T. having a value of AM/PM conversion of 10 degrees per db (i.e., 0.175 radian per db).

The phase modulation created by the T.W.T. can either add to or subtract from the phase of the original FM signal, thus changing its modulation index. At low modulation signal frequencies (e.g., 100 kHz.) the phase deviation of the FM signal will be large compared with that of the PM interference (e.g., 50 radians compared to 0.175). The interference therefore will be of little consequence. However, at high modulation signal frequencies (e.g., 10 mHz.), the phase deviation of the original FM signal and that of the PM interference will be of the comparable magnitude (e.g., 0.5 radian compared to 0.175). The PM interference could, therefore, considerably change the net phase deviation of the output signal. To prevent such PM distortion a limiter may be used prior to the T.W.T. so as to remove the offending residual AM from the input FM signal.

The phenomenon of AM/PM conversion can arise from other causes than residual AM in an FM signal. For instance, the input transducer to a T.W.T. generally does not have a perfectly flat amplitude-versus-frequency characteristic. An FM signal applied to the T.W.T. through the transducer undergoes greater attenuation at some frequencies than at others. Consequently the frequency modulated signal becomes amplitude modulated at the T.W.T. input and in turn phase modulated at the T.W.T. output. Such PM distortion cannot be eliminated by a limiter at the T.W.T. input, but can be reduced by designing the transducer and the T.W.T. to produce minimum AM/PM conversion.

It is a broad object of this invention to measure the AM/PM conversion of systems or devices in which electrical length is a function of input power level.

Prior art test sets for measuring AM/PM conversion generally employ bridge techniques of the type described in an article by A. Slocum et al. entitled "6 KMC Phase Measurement System for Traveling Wave Tubes," IRE Transactions on Instrumentation, No. 4, 1955. The two arms of the bridge are the apparatus arm, containing the device under test, and the standard arm, containing a calibrated phase shifter. A ferrite modulator introduces one db of 60 c.p.s. amplitude modulation into a test signal which is split by a hybrid junction at the bridge input. Half of the modulated signal serves as input to the device under test and half serves as a reference phase for a phase detector connected at the bridge output. The signals at the phase detector input are maintained equal at constant level and nominally in phase quadrature. The phase detector is essentially a bridge circuit, the output of which is a DC voltage proportional to the phase difference of its two inputs. The output of the detector is, therefore, a direct measure of the phase modulation created in the device under test.

The bridge technique suffers from several disadvantages which tend to limit its versatility and its accuracy to about a 15 percent error. The bridge arms are frequency sensitive. Any difference in changes of electrical length with frequency (i.e., frequency dispersion) between the apparatus and standard arms introduces a corresponding phase shift at the phase detector input which gives an erroneous indication of the phase shift produced by the device under test. The frequency dispersion of the apparatus arm and the standard arm therefore must be maintained equal for all frequencies at which the AM/PM conversion is to be measured. That is, the bridge must be balanced (or nulled) for each such frequency. These frequencies define a range of frequencies which will hereinafter be termed the test band.

In addition, the versatility of the bridge technique is limited by the fact that the phase detector, a bridge circuit, contains in each arm a microwave tuner which must be tuned to each frequency at which the AM/PM conversion is to be measured.

The accuracy of the bridge technique is further limited by the fact that the phase detector is amplitude sensitive unless the inputs to its bridge circuit are maintained in phase quadrature. (See FIG. 6 of the Slocum et al. article.) To maintain the bridge input (at fundamental frequency) in perfect phase quadrature, however, is difficult. A small error generally results. The problem is further complicated by the fact that the device under test, typically a traveling wave tube, generates harmonics of the fundamental frequency in the apparatus arm. These harmonic frequencies are not necessarily in phase quadrature, and consequently the apparatus arm is amplitude sensitive.

It is, therefore, another object of the invention to measure the AM/PM conversion of a device with reduced use of frequency sensitive components.

In accordance with an illustrative embodiment of the present invention, the AM/PM conversion of a device is measured by a test set comprising a modulated signal generator and a single sideband converter coupled to the input of the device under test. A microwave generator, the local oscillator of the single sideband converter, is connected to one input of a mixer. The output of the device under test is connected through a filter, centered at the sideband frequency, to the other mixer input. The mixer output, which may be passed through an amplifier if desired, is monitored by an FM deviation meter.

The method of operation of the test set is essentially as follows. A control signal and a sampling signal, produced respectively by the modulated signal generator and the single sideband converter, are simultaneously coupled to the input of the device under test. The control signal is amplitude modulated at a known level and can be swept across the test band (not necessarily the 3 db bandwidth). The sampling signal, which is single sideband, has an average power level typically about 30 db below that of the control signal and is at frequency transmitted by the device but just outside the test band swept by the control signal. By maintaining both the depth of modulation of the control signal and the power of the sampling signal at a low level, second order effects, such as cross modulation between the sampling and control signals, are reduced.

At the output of the device under test the sampling signal, which is now *phase* modulated in accordance with the *amplitude* modulation of the control signal, is filtered from the control signal and mixed with its own phase-coherent local oscillator signal. The output of the mixer is fed into the frequency deviation meter. From the measured frequency deviation and the known level of modulation of the control signal, the AM/PM conversion can be calculated.

The accuracy of the invention is within a 5 percent error, exceeding that of prior art test sets by a factor of about three. Furthermore, the invention permits the measurement of the AM/PM conversion at all frequencies within the device bandwidth with the use of the same equipment without the necessity of tuning frequency sensitive components or providing for equal frequency dispersion in each of the microwave paths.

The above and other objects of the invention, together with its various features and advantages, can be easily understood from the following more detailed discussion, taken in conjunction with the accompanying drawings, in which.

Figure 1:
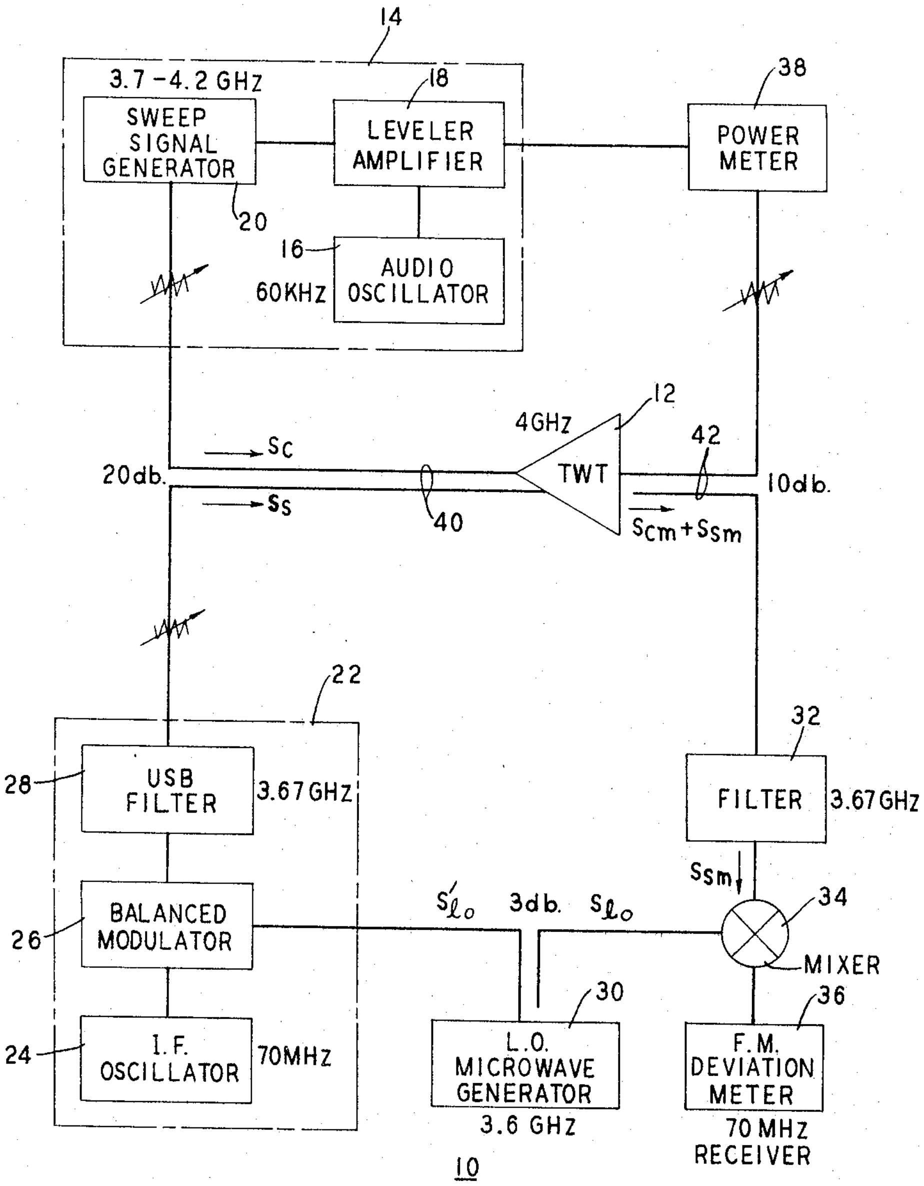
FIG. 1 is a block diagram of the invention arranged to test a four gigahertz traveling wave tube.

Referring now to FIG. 1 there is shown a test set 10 for measuring the AM/PM conversion of a four gigahertz (4 gHz.) traveling wave tube 12. The choice of a 4 gHz. traveling wave tube is for illustrative purposes only and is not intended to limit the scope of the invention. In place of the traveling wave tube could be any device or system in which electrical length is a function of power level.

The test set 10 comprises a modulated signal generator 14 and a single sideband converter 22 coupled to the input of the traveling wave tube 12. The modulated signal generator 14 comprises an audio oscillator 16, a leveler amplifier 18 (typically a DC amplifier), and a sweep signal generator 20 connected in tandem in the order recited. Alternatively, the audio oscillator 16 may be directly coupled to the sweep signal generator 20 instead of being connected to the leveler amplifier 18.

In order to maintain the TWT output power at a constant level, the output of the traveling wave tube is fed back to the leveler amplifier 18 through a power meter 38 whose output is a DC voltage proportional to the TWT output power level. As the TWT output power level increases above some predetermined value, the leveler amplifier decreases the voltage input level to the sweep signal generator 20, thereby decreasing the power input to the TWT until the power output of the TWT is at the predetermined level. In the alternative, a similar arrangement, with the power meter 38 connected to the input of the TWT, would maintain the TWT input power level constant, if so desired.

The single sideband converter 22 comprises an IF oscillator 24, a balanced modulator 26, and an upper sideband filter 28, also connected in tandem in the order recited.

A microwave generator 30, the local oscillator of the single sideband converter 22, produces two substantially phase coherent signals $S_{10}$ and $S_{10}'$, $S_{10}'$ being coupled to the balanced modulator 26, and $S_{10}$ being coupled to one input of a mixer 34. The microwave generator 30 is typically a klystron oscillator. The output of the traveling wave tube 12 is coupled through a bandpass filter 32 to the other input of the mixer 34. The output of the mixer 34 is in turn monitored by an FM deviation meter 36.

The method of operation is essentially as follows. The modulated signal generator 14 generates an amplitude modulated control signal, $S_c$, at a carrier frequency transmitted by the traveling wave tube (e.g., between 3.7 gHz. and 4.2 gHz.) and at a known level of modulation, M. The signal which modulates the control signal is generated by the audio oscillator 16 operating at $F_m$ cycles per second, herein chosen to be 60 kHz.

The single sideband converter 22 generates a single sideband sampling signal, $S_s$, at the upper sideband frequency (e.g., 3.67 gHz.). This frequency is transmitted by the traveling wave tube but is different from that of the control signal. The 3.67 gHz. upper sideband is produced by feeding a 70 mHz. signal from the IF oscillator 24 and a 3.6 gHz. signal from the microwave generator 30 into the balanced modulator 26 and then filtering out the lower sideband.

The power level of the sampling signal is preferably maintained substantially less (typically 30 db less) than the power level of the control signal. By so maintaining the power level of the two signals, the characteristics of the traveling wave tube 12 are controlled primarily by the control signal. Specifically, the electrical length of the traveling wave tube 12 varies only with amplitude changes of the control signal, and is substantially unaffected by the sampling signal. Second order effects, such as cross modulation between sampling and control signal, are also reduced by keeping power of the sampling signal at a low level.

The sampling and control signals are simultaneously coupled through a directional coupler 40 to the input of the traveling wave tube 12. At the output of the traveling wave tube 12 the sampling signal, $S_{sm}$, which is now *phase* modulated in accordance with the *amplitude* modulation of the control signal, is coupled through a directional coupler 42 to a bandpass filter 32 centered at the 3.67 gHz. upper sideband frequency. The bandpass filter 32 separates the phase modulated sampling signal, $S_{sm}$, from the control signal $S_{cm}$, which also happens to be phase modulated, thus preventing $S_{cm}$ from overloading the FM deviation meter 36. The phase modulation impressed upon $S_{sm}$ is characterized by a frequency deviation $F_d$. It is to be noted, however, that if the FM deviation meter 36 is inherently capable of detecting $S_{sm}$ in the presence of the high power level of $S_{cm}$, then the bandpass filter 32 can be eliminated.

The output of the bandpass filter 32, which is $S_{sm}$ at 3.67 gHz., is heterodyned at mixer 34 with the 3.6 gHz. phase-coherent signal $S_{10}$ from the microwave generator 30. It is to be noted here that the mixer 34 may be preceded by a limiter to eliminate residual AM in the signal $S_{sm}$ and then followed by a preamplifier if desired. The output of the mixer is a frequency modulated 70 mHz. signal (the frequency of IF oscillator 24) also characterized by the same frequency deviation $F_d$ as that impressed upon $S_{sm}$. This signal is fed into the frequency deviation meter 36, a 70 mHz. FM receiver. From the measured frequency deviation, $F_d$, the AM/PM conversion $K_p$, in degrees per db can be calculated by the following equation:

$$K_p = 360F_d/MF_m \quad (1)$$

Figure 2:
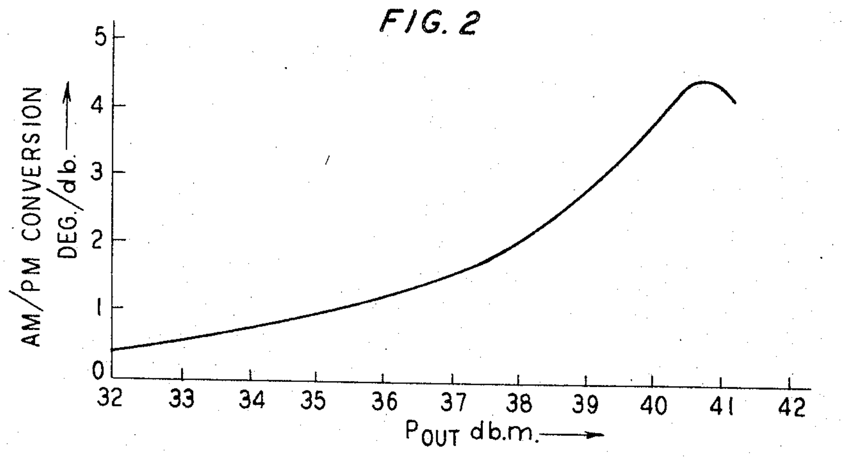
FIG. 2 is a graph of the AM/PM conversion versus power output for a four gigahertz traveling wave tube.

Typical values of the parameters of Equation 1 are $F_d$=0.5 kHz., M=1 db, $F_m$=60 kHz., and $K_p$=3 degrees per db. FIG. 2 shows a graph of AM/PM conversion as a function of power output for a four gigahertz traveling wave tube. In FIG. 2 the control signal frequency is selected within the TWT test band, and the power input to the TWT is varied by changing the power level of the control signal, $S_c$. The output power is then monitored and plotted against the measured AM/PM conversion. As FIG. 2 indicates the AM/PM conversion increases nonlinearly from about 0.5°/db to 5.0°/db as the power output of the TWT increases from 32 dbm. to almost 41 dbm. Furthermore, the curve remains substantially fixed for all frequencies selected within the TWT test band.

Figure 3:
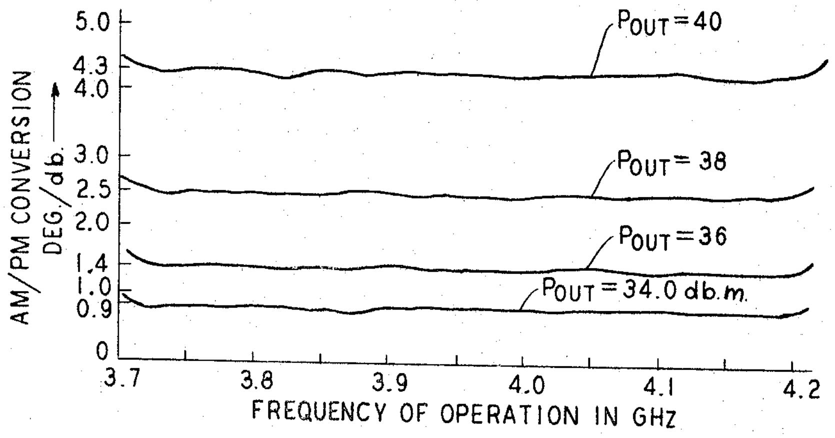
FIG. 3 is a graph of the AM/PM conversion versus frequency for a four gigahertz traveling wave tube.

The test set 10 is quite versatile. For a fixed TWT power level output the frequency of the control signal can be varied across the TWT test band by means of sweep signal generator 20, and in so doing, all equipment remains unchanged. No tuning, rebalancing or replacing of components is required. FIG. 3 shows a typical plot of AM/PM conversion versus frequency with power output as a parameter for a 4 gHz. TWT. As shown, for a particular power output the AM/PM conversion remains substantially constant (i.e., within the bounds of measurement accuracy) for all frequencies within the TWT test band. FIG. 3 also indicates that AM/PM conversion increases as power output increases as previously discussed with reference to FIG. 2.

The test set 10 was previously described as generating a single sideband sampling signal. It is also possible, however, to operate the test set utilizing a double sideband-suppressed carrier signal. In the ideal case it would be possible to eliminate both single and double sideband processes and to utilize just the single frequency signal from the microwave generator 30. In the ideal case, then, the need for entire single sideband converter 22 and the mixer 34 would be obviated. However, the lack of phase stability of high frequency (gigahertz) oscillators necessitates the heterodyning technique previously described. Essential to this technique is that the microwave generator produce phase-coherent signals $S_{10}$ and $S_{10}'$ so that any frequency shift occurring in microwave generator 30 will be canceled at the output of the mixer 34. Thus, the heterodyning technique enables the use of frequency unstable sources while maintaining measurement accuracy.

In the foregoing the test set 10 was described in terms of what might be considered a closed loop system. That is, the input and output of the transmission system under test are joined at the microwave generator 30 in a closed loop. Such an arrangement is quite feasible when the input and output of the transmission system are reasonably proximate to one another. On the other hand, consider the problem of measuring the AM/PM conversion of a coast to coast system, such as a color TV network, with the single sideband converter 22 located on one coast and the FM deviation meter 36 and mixer 34 located on the other coast.

With such nationwide systems it is possible to operate the test set under open loop conditions. That is, the microwave generator 30 is eliminated, and the input and output ends of the nationwide system are not joined. Instead, the local oscillator signal $S_{10}'$ (and therefore $S_s$ as well) is generated by a highly phase stable (e.g., one part in $10^{12}$) oscillator located on one coast, and the local oscillator signal $S_{10}$ is generated by a second highly phase stable oscillator located on the other coast. It is still essential, however, that the signals $S_{10}$ and $S_{10}'$ be phase coherent; that is, the differential phase jitter between $S_{10}$ and $S_{10}'$ should preferably generate a frequency deviation much less that the overall system frequency deviation due to AM/PM conversion.

The base band frequency of operation of such a nationwide system is in the megahertz range. At these frequencies highly phase stable oscillators, not attainable in the gigahertz range, are available. It is therefore possible to use separate oscillators to generate $S_{10}$ and $S_{10}'$ and still maintain substantial phase coherence.

The method of measurement in accordance with this invention was developed from the following theoretical considerations regarding the traveling wave tube. A study of the AM/PM conversion phenomenon inherent in TWT's will show that the electrical length of the device is a function of both beam and helix phase velocity according to the relationship:

$$\theta = \left[\frac{\omega}{v_b} + \frac{\omega}{v_h}\right]\frac{L}{2} \quad (2)$$

where $v_b$=average beam velocity, $v_h$=helix phase velocity for the increasing wave, L=helix length and $\omega$=radian frequency.

The average beam velocity is in turn a function of the DC helix voltage and the power withdrawn from the beam during amplification. Thus, assuming beam current constant:

$$v_b = \frac{\sqrt{2\eta}}{L}\int_0^L \sqrt{V_h - \Delta V_b}\, dl \quad (3)$$

where $\eta$=electron charge-to-mass ratio; $V_h$=DC helix potential, $l$=some length $0 < l \leq L$; and $\Delta V_b$=change in beam voltage due to power withdrawn from the beam during amplification.

The change in beam voltage, $\Delta V_b$, is expressed in terms of input power and gain by the following expression:

$$\Delta V_b = P_i eBl/I_b$$

where $P_i$=effective input power; $B = \pi f C\sqrt{3/v_h}$; $I_b$=beam current; and C is Pierce's gain parameter.

From expressions (2), (3) and (4) it can be shown, through complicated mathematical analysis, that the partial derivative $\partial\theta/\partial P_i$ yields an AM/PM conversion ratio.

What is claimed is:

1. Apparatus for measuring the AM/PM conversion of a transmission system having a particular bandwidth characteristic and producing phase modulation in signals of time varying power level;

said apparatus comprising:

means for generating an amplitude modulated first signal at a frequency transmitted by said transmission system and at a particular average power level;

means for generating a second signal at a frequency transmitted by said transmission system, but at a frequency different from the frequency of the first signal, and at an average power level substantially less than the average power level of the first signal, thereby reducing cross modulation between the first and second signals;

means for coupling the first and second signals to the input of said transmission system;

said transmission system producing phase modulation in the second signal in accordance with the amplitude modulation of the first signal, whereby a frequency deviation is produced in the second signal; and means for measuring at the output of said transmission system the frequency deviation of the second signal, whereby a measure of the AM/PM conversion is obtained.

2. The apparatus of claim 1 wherein:
said first signal generating means comprises:
a signal generator connected to the input of said transmission system;
feedback means connected to said transmission system and to the input of said signal generator for the purpose of maintaining the power level of said transmission system at a predetermined level; and
a first oscillator connected to said signal generator, thereby to amplitude modulate the signal produced by said signal generator.

3. The apparatus of claim 2 wherein:
said feedback means comprises;
a power meter connected to said transmission system, thereby to convert the power level of said transmission system into a proportional voltage at the output of the power meter; and
an amplifier connected to the output of the power meter and to the input of the signal generator such that as the power level of said transmission system deviates from the predetermined level, said amplifier changes the voltage input level to said signal generator, thereby changing the power input to said transmission system until the power level of said transmission system is at the predetermined level.

4. The apparatus of claim 1 wherein:
the second signal generating means comprises;
a balanced modulator having first and second inputs;
a second oscillator for generating two phase coherent signals;
said second oscillator having first and second outputs, the first output of said second oscillator being connected to the first input of said balanced modulator;
an intermediate frequency oscillator connected to the second input of said balanced modulator, thereby to produce a double sideband suppressed-carrier signal at the output of said balanced modulator;
a first upper sideband filter connected to the output of said balanced modulator, thereby to transmit the upper sideband signal through said coupling means to the input of said transmission system;
said transmission system input coupling means comprising a directional coupler;
means for separating at the output of said transmission system the first and second signals on the basis of their frequencies;
means for changing the frequency of the second signal; and
means for measuring the frequency deviation of the second signal, whereby a measure of the AM/PM conversion is obtained.

5. The apparatus of claim 4 wherein:
said signal separating means comprises a second upper sideband filter, the input of which is coupled to the output of said transmission system, thereby to separate on the basis of their frequencies the second signal from the first signal;
said frequency changing means comprises a mixer having first and second inputs, the first input being connected to the output of said second upper sideband filter and the second input being connected to the second output of said second oscillator, thereby to change the frequency of the second signal to the intermediate frequency of said intermediate frequency oscillator; and
said measuring means comprises a frequency modulation receiver to receive signals at the intermediate frequency of the second signal and to produce at its output a measure of the frequency deviation of the second signal.

6. The method of measuring the AM/PM conversion of a transmission system having a particular bandwidth characteristic and producing phase modulation in signals of time varying power level comprising the steps of:
generating an amplitude modulated first signal at a frequency transmitted by the transmission system and at a particular average power level;
generating a second signal at a frequency transmitted by the transmission system, but at a frequency different from the frequency of the first signal, and at an average power level substantially less than the average power level of the amplitude modulated first signal, thereby reducing cross modulation between the first and second signals;
coupling the first and second signals to the input of the transmission system which produces phase modulation, and a corresponding frequency deviation, in the second signal in accordance with the amplitude modulation of the first signal; and
measuring at the output of the transmission system the frequency deviation of the second signal, whereby a measure of the AM/PM conversion is obtained.

7. The method of claim 6 wherein the measuring step comprises the steps of:
separating at the output of the transmission system the first and second signals on the basis of their frequencies;
passing the second signal through a frequency modulation receiver whose output is a measure of the frequency deviation of the second signal.

References Cited

UNITED STATES PATENTS

| | | | |
|---|---|---|---|
| 2,714,663 | 8/1955 | Norton | 324—82 XR |
| 3,358,227 | 12/1967 | Taylor | 324—79 X |

RUDOLPH V. ROBINEC, *Primary Examiner.*

P. F. WHITE, *Assistant Examiner.*

U.S. Cl. X.R.

324—79